(12) United States Patent
Federspiel

(10) Patent No.: US 7,762,583 B2
(45) Date of Patent: Jul. 27, 2010

(54) SEAT SENSOR SYSTEM

(75) Inventor: Laurent Federspiel, Munsbach (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 447 days.

(21) Appl. No.: 11/578,977

(22) PCT Filed: Apr. 22, 2005

(86) PCT No.: PCT/EP2005/051811

§ 371 (c)(1),
(2), (4) Date: Oct. 18, 2006

(87) PCT Pub. No.: WO2005/102787

PCT Pub. Date: Nov. 3, 2005

(65) Prior Publication Data

US 2007/0241545 A1    Oct. 18, 2007

(30) Foreign Application Priority Data

Apr. 22, 2004   (EP) .................................. 04101687

(51) Int. Cl.
*B60R 21/16* (2006.01)
(52) U.S. Cl. .................................................. 280/735
(58) Field of Classification Search .................. 280/735
See application file for complete search history.

(56) References Cited

U.S. PATENT DOCUMENTS

| 5,871,063 | A |  | 2/1999 | Young |
| 5,986,357 | A | * | 11/1999 | Myron et al. ............... 307/116 |
| 6,304,179 | B1 |  | 10/2001 | Lotito et al. |
| 7,194,346 | B2 | * | 3/2007 | Griffin et al. ................... 701/45 |
| 2003/0056997 | A1 | * | 3/2003 | Breed et al. .................. 177/144 |
| 2004/0069075 | A1 | * | 4/2004 | Jakoby et al. .......... 73/862.046 |
| 2006/0283651 | A1 | * | 12/2006 | Fultz et al. ................... 180/272 |
| 2007/0083311 | A1 | * | 4/2007 | Tabe ............................ 701/45 |
| 2007/0085697 | A1 | * | 4/2007 | Breed .................... 340/825.72 |

FOREIGN PATENT DOCUMENTS

| DE | 42 37 072 | 11/1992 |
| DE | 101 26 699 | 12/2002 |
| DE | 102 27 286 | 1/2004 |
| WO | WO 03/024749 | 3/2003 |

\* cited by examiner

*Primary Examiner*—Faye M. Fleming
(74) *Attorney, Agent, or Firm*—Cantor Colburn LLP

(57) ABSTRACT

A seat sensor system comprises at least one seat sensor for sensing a status related to a seat occupancy and for generating a output signal indicative of said status and a control unit for communicating with said at least one seat sensor. According to the invention the seat sensor comprises a self-powered transmitter associated with a seat for transmitting a data signal containing said output signal and the control unit comprises an receiver module for receiving said data signal from said self-powered transmitter.

29 Claims, 2 Drawing Sheets

SEAT SENSOR SYSTEM

BACKGROUND OF THE INVENTION

The present invention generally relates to a seat detector e.g. for use in an automotive vehicle.

In modern vehicles, seat occupancy sensors are widely used in order to detect whether a passenger seat is occupied or not. The information about the occupancy of the passenger seat may then be used in order to control the deployment of one or more airbags associated to the vehicle seat (the deployment is e.g. inhibited if the vehicle seat is found to be non occupied).

Today's automotive safety standards require automotive vehicles to be equipped with seat belt reminder systems for reminding a vehicle passenger to fasten the seat belt associated to the occupied vehicle seat. Such seat belt reminder system comprise typically a seat occupancy sensor for detecting an occupancy of a vehicle seat and a seat belt sensor, e.g. a buckle switch sensor, for detecting whether a seat belt is fastened or not.

While until now, those seat sensors where mainly associated with the front seats of the vehicle e.g. for controlling airbag systems associated to the front seats or for generating warning signals relating to the fastening of the seat belts associated with the front seats, future standards will require that also rear seat be equipped with such seat occupancy sensors and seat belt reminder systems.

The seat occupancy sensors used in airbag control systems or seat belt reminder systems usually comprise pressure sensing devices integrated in the respective passenger seat for detecting a pressure induced by the presence of a passenger into the seat. The pressure sensing devices, as e.g. disclosed in DE-A-42 37 072, comprise a plurality of individual force sensors, which are connected in a suitable manner to a control unit designed for measuring a pressure depending electrical property of said individual pressure sensors. These occupancy sensors have proven to be very reliable and well adapted to the detection of seat occupancy.

The seat belt fastening detectors of seat belt reminder systems typically comprise mechanical or magnetic buckle switches for detecting, whether a latch of the seat belt is inserted into the seat belt buckle. One such buckle switch is e.g. disclosed in U.S. Pat. No. 5,871,063. As an alternative to the buckle switches, seat belt fastening detectors have been proposed which generate a buckled/unbuckled signal based on the tension in the seat belt.

One drawback of these known seat sensors lies in the fact, that the seat occupancy sensor and/or the seat belt fastening detector have to be physically connected to the control unit by means of connection wires in order to be functional. This need for physically connecting the sensing device to the control unit however causes problems especially in modern cars equipped with a flexible seating system with removable and/or displaceable back seats.

BRIEF SUMMARY OF THE INVENTION

In order to overcome the abovementioned problems, the present invention proposes a seat sensor system comprising at least one seat sensor for sensing a status related to a seat occupancy and for generating an output signal indicative of said status and a control unit for communicating with said at least one seat sensor. According to the invention said at least one seat sensor comprises an autonomously powered transmitter device associated with a seat, said autonomously powered transmitter device for transmitting a data signal containing said output signal and said control unit comprises an receiver module for receiving said data signal from said autonomously powered transmitter device.

The seat sensor system of the present invention is configured so as to enable remote communication between the seat sensor associated to the seat and the control unit for the seat sensor. The seat sensor accordingly transmits the data signal containing information regarding the seat occupancy related status wirelessly to the control unit. It follows that the seat sensor does not need to be connected to the control unit by means of connection lines. No wiring of the seat sensor being necessary, the seat sensor system does not negatively affect the advantages of the flexible seating systems of modern vehicles with removable and/or displaceable back seats.

According to the present invention, the transmission of the data signal is achieved by means of a self-powered transmitter, i.e. an autonomously powered transmitter device. Such autonomously powered transmitter devices are known since several years and include a device for converting a mechanical energy into an electrical energy. Accordingly, the autonomously powered transmitter device does neither rely on an external electric power supply (connected by cabling) nor on internal battery power. The autonomously powered transmitter device is accordingly suitable for autonomous operation which eliminates the need for cabling or occasional battery replacement.

The control unit receives the data signal transmitted from the seat sensor and may further process this signal in order to e.g. generate either a warning signal (in case of a seat belt reminder system) or an airbag control signal (if the seat sensor is used for controlling the deployment of the airbag(s) associated with the seat). As the data signal from the seat sensor is remotely received, the control unit does not need to be installed into the vehicle seat but may be arranged at any suitable stationary location inside the vehicle. The control unit is accordingly not integrated into a (possibly) removable or displaceable seat so that power supply via cabling or wired connection to further components of the vehicle's electronic system is no issue.

The present seat sensor system thus enables autonomous seat occupancy detection in the seat, which in addition does not require regular maintenance. Accordingly the present seat sensor system is perfectly suited for the operation in removable vehicle seats.

It will be noted that the control unit should preferably be mounted into the vehicle in such a way that a receiving antenna of the receiver module is centrally located into the vehicle compartment. In this case, the control unit may receive data signals transmitted both from seat sensors arranged in front vehicle seats and in rear seats. In this embodiment, the seat sensor system may comprise a plurality of seat sensors associated with different seats of a vehicle, and said control unit is configured for communication with each of said plurality of seat sensors. A single common control unit reduces the complexity of the sensor system and consequently the overall costs of the system.

The autonomously powered transmitter device preferably comprises a transmitter module, a piezo generator for converting a mechanical energy into electrical energy and an electronic converter unit for generating a transmitter module power supply from said electrical energy. Self-powered transmitters of this kind are known as non-powered pushbuttons for performing remote switching operations. One such pushbutton is e.g. disclosed in the article "A Compact, Wireless, Self-Powered Pushbutton Controller," Joseph A. Paradiso and Mark Feldmeier. In Abowd, G. D., Brumitt, B., and Shafer, S., eds, "Ubicomp 2001: Ubiquitous Computing,"

ACM UBICOMP Conference Proceedings, Atlanta Ga., September 2001, Springer-Verlag Berlin Heidelberg, 2001, pp. 299-304.

Piezo generators are known for their low weight, small size, minimal complexity and low costs. These properties make piezo generators best suitable for the integration into a vehicle environment. In the environment of an automotive vehicle, the mechanical energy to be converted into electrical energy comes from both a pressure, an occupant exerts on the piezo generator integrated in the vehicle seat, and the constant motion induced vibrations in the seat. An occupant sitting in the vehicle seat exerts indeed a varying pressure on the piezoelectric element due to vibrations caused by the vehicle movement, so that the piezo-powered generator generates the required power for the electronic unit.

Since piezoelectronics produce high voltages at low currents and standard electronic circuitry requires low voltages at high currents, an electronic converter unit is used to convert the high voltage pulses of the piezo generator into a suitable DC current for supplying the transmitter module. In a very simple embodiment, the electronic converter unit may comprise a simple diode as rectifier and/or voltage limiter.

The transmitter module may be a low power RF transmitter. Radio waves pass freely through people and non-metallic parts such that safe transmission to the control unit is ensured.

In a preferred embodiment, said autonomously powered transmitter device further comprises processing means for encoding said output signal with a digital ID of said seat sensor into said data signal. In a multi-sensor environment, i.e. if the seat sensor system comprises a plurality of seat sensors, each individual seat sensor, from which a specific signal emanates, is infallibly identifiable by the control unit so that the appropriate measures may be taken with respect to the correct seat.

It should be noted, that the piezo generator of the autonomously powered transmitter device could itself act as seat occupancy detector. In fact, if the piezo generator is suitably configured so as to operate only if an occupant is actually sitting in the seat, the transmitter module will only be powered if the seat is actually occupied. This means on the other hand, that if the control unit receives a signal from the transmitter unit, the seat is necessarily occupied. In this embodiment, no further dedicated seat occupancy sensor is needed. In order to ensure a reliable detection of a seat occupancy, the piezo generator should then comprises a piezofilm associated to a seating surface of said seat and extending over a substantial part of the seating surface.

In an alternative embodiment, in which the autonomously powered transmitter device is only used for its power generating and signal transmitting properties, the seat sensor further comprises a seat occupancy detector for sensing an occupancy of said seat, said pressure sensor being connected to said autonomously powered transmitter device and/or a seat belt fastening detector for determining a seat belt usage condition related to said seat, said seat belt fastening detector being connected to said autonomously powered transmitter device. In these embodiments, the individual sensing functions are performed by dedicated specialized sensing elements. The occupancy sensor may e.g. comprise a pressure sensitive switching device comprising a plurality of individual pressure sensors or switches arranged at different locations with respect to a seat surface. These pressure sensitive switching devices have proven to be very reliable and well adapted to the detection of seat occupancy.

It will further be appreciated, that the seat belt fastening detector preferably comprises a seat belt buckle switch sensor. This seat belt buckle switch sensor is integrated into the seat belt buckle for detecting, whether the latch of the seat belt is inserted into the seat belt buckle. The seat belt buckle itself is typically mounted on the seat and not on the vehicle floor and accordingly the seat belt buckle is removable together with the seat (as is as the seat occupancy sensor). The buckle switch is connected to the autonomously powered transmitter device, so that the fastening status of the seat belt may be included into the data signal to be transmitted to the control unit.

BRIEF DESCRIPTION OF THE FIGURES

The present invention will be more apparent from the following description of several not limiting embodiments with reference to the attached drawings, wherein.

DETAILED DESCRIPTION OF THE INVENTION

Figure 1:
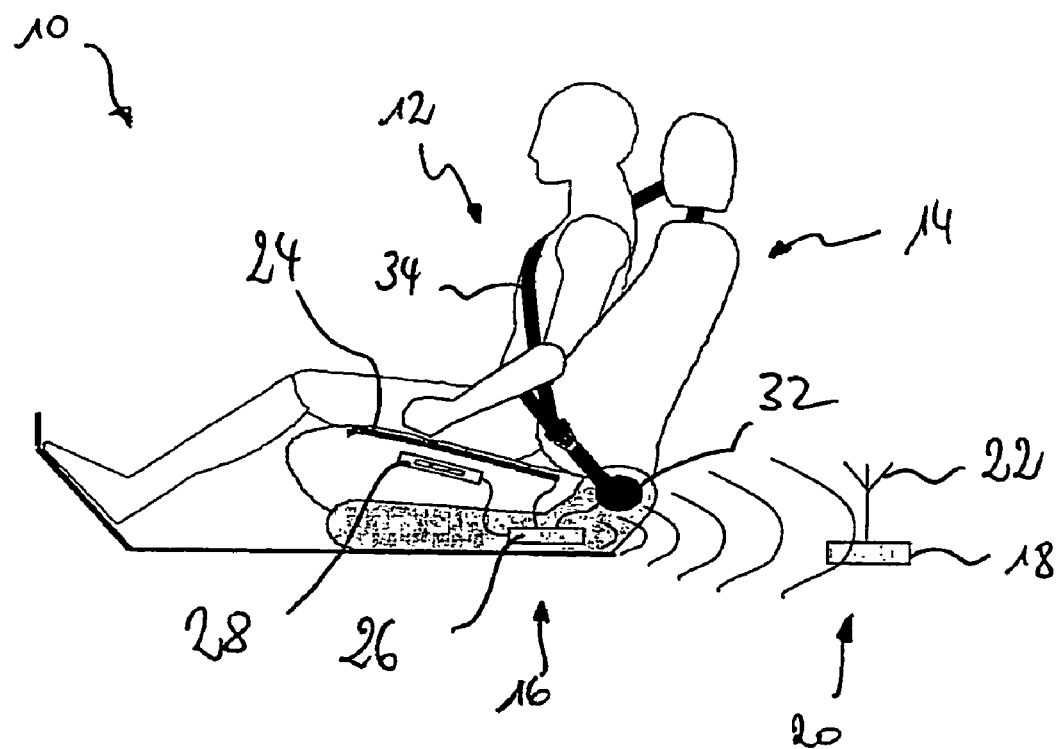
FIG. 1: shows part of a vehicle compartment with a first embodiment of a seat sensor system associated with a vehicle seat.

FIG. 1 schematically illustrates an interior compartment 10 of a vehicle with a passenger 12 sitting in a front seat 14. The vehicle seat 14 is equipped with a seat sensor 16 which remotely communicates with a receiver module 18 of control unit 20. Control unit 20 is mounted in a suitable location in the vehicle compartment, e.g. on the vehicle floor or onto the vehicle roof. Control unit 20 should preferably be mounted into the vehicle in such a way that a receiving antenna 22 of the receiver module 20 is centrally located into the vehicle compartment. In this case, the control unit 20 may receive data signals transmitted both from seat sensors arranged in front vehicle seats and in (not shown) rear seats.

In the shown embodiment, the seat sensor 16 comprises a seat occupancy sensor 24 arranged in the seat cushion of seat 14. The seat occupancy sensor 24 typically includes a pressure sensitive switching mat having a plurality of individual pressure sensors distributed over the seating area of the seat.

The seat occupancy sensor 24 is connected to a transmitter module 26, preferably an RF transmitter, which is able to transmit an occupancy related output signal from the seat occupancy sensor 24 to the control unit 20. Transmitter module 26 is e.g. arranged in the base of the seat 14 and is part of a self-powered transmitter, which further comprises a piezo-generator 28 associated with the transmitter module 26.

Piezo generator is integrated into the seat cushion of the vehicle seat, so as to be exposed to the pressure exerted by an occupant on the seat. Piezo generator 28 then converts mechanical energy (pressure exerted by the passenger and vibrations due to movement of the car) into electrical energy, which is converted into a suitable DC supply voltage for transmitter module 26 by means of a power converter 30 (see FIG. 3).

In the shown embodiment, the seat sensor 16 comprises a buckle switch sensor 32, which is integrated into the seat belt buckle for detecting, whether the latch of the seat belt 34 is inserted into the seat belt buckle. Like the seat occupancy sensor 28, seat belt buckle switch 32 is also connected to transmitter module 26. It should be noted, that transmitter module 26 may transmit the individual output signals of the seat occupancy sensor 26 and the buckle switch sensor 32 separately to the receiving module 22. In a preferred embodiment, transmitter module comprises however a processing unit 36, which is able to combine the individual output signals into a combined data signal to be transmitted. Furthermore, the processor means is preferably configured for encoding the combined output signal with a digital ID of said seat sensor into said data signal. In a multi-sensor environment, i.e. if the seat sensor system comprises a plurality of seat sensors, each individual seat sensor is then identifiable by the control unit so that the appropriate measures may be taken with respect to the correct seat.

Figure 2:
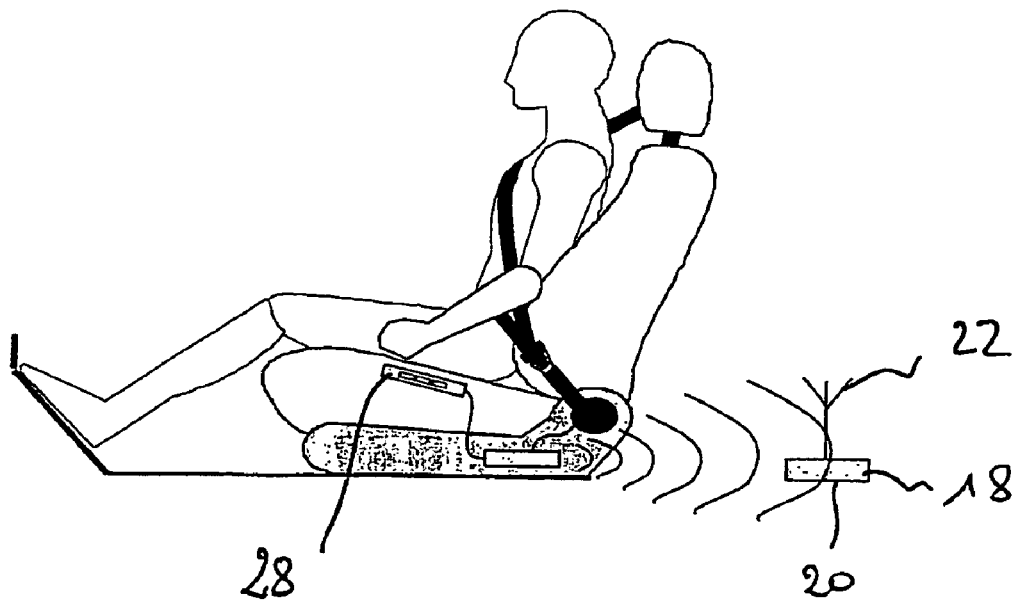
FIG. 2: shows part of a vehicle compartment with a second embodiment of a seat sensor system associated with a vehicle seat.

FIG. 2 shows a different embodiment of the seat sensor 16. In this embodiment, the piezo generator 28 acts as a seat occupancy detector, so that no dedicated pressure switching mat is required. The piezo generator 28 is preferably configured as a piezofilm, which is arranged in the vicinity of the seating surface.

Figure 3:
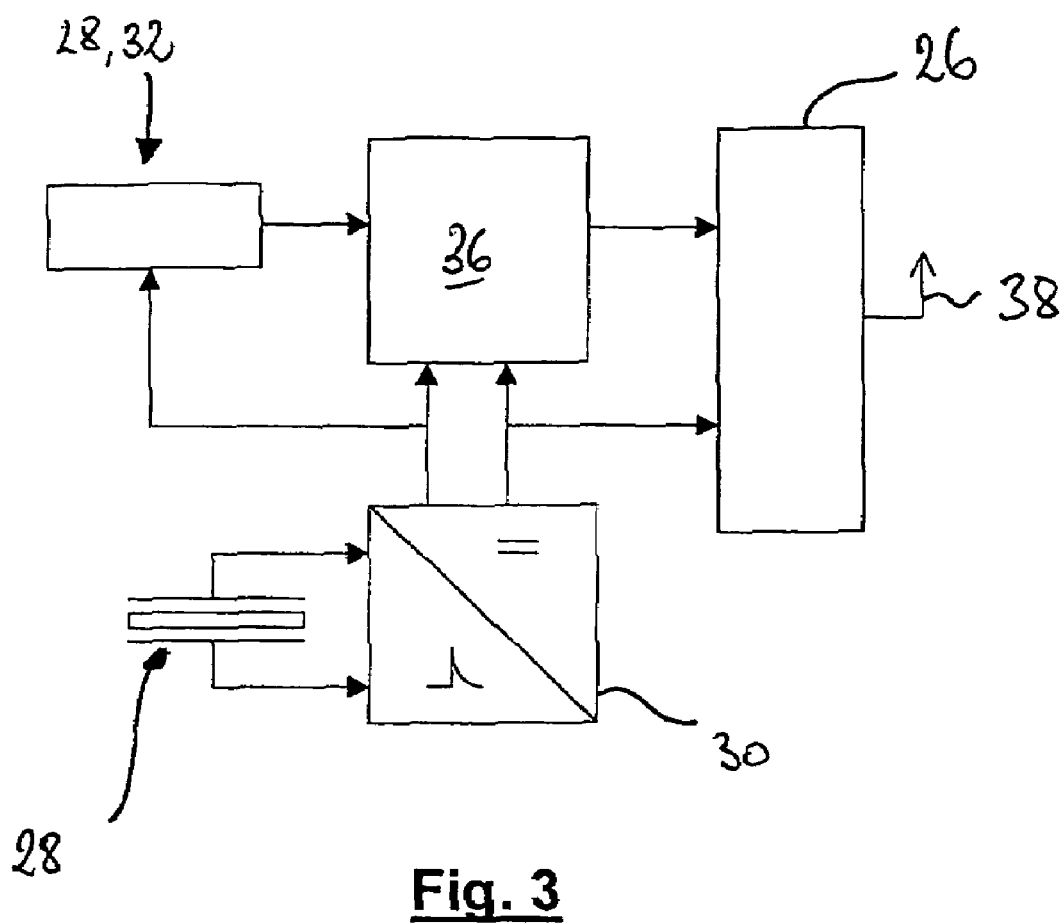
FIG. 3: shows a bloc diagram of an embodiment of the seat sensor.

FIG. 3 shows a block diagram of an embodiment of the seat sensor. Piezo generator 28 is connected to the power converter 30, which converts the generated voltage pulses into a suitable DC voltage for powering the processor 36, the transmitter module 26 and if necessary, one or more supplemental sensing devices such as seat occupancy sensor 28 or buckle switch sensor 32. The sensing devices 28, 32 are connected to processor 36 which encodes the different output signals preferably together with a digital ID into combined data signal. This combined data signal is then transmitted by transmitter module 26 via sending antenna 38 towards control unit 20.

The invention claimed is:

1. Seat sensor system comprising
   at least one seat sensor for sensing a status related to a seat occupancy and for generating an output signal indicative of said status, and
   a control unit for communicating with said at least one seat sensor,
   wherein said at least one seat sensor comprises an autonomously powered transmitter device associated with a seat, said autonomously powered transmitter device including a device configured to power the autonomously powered transmitter through a conversion of a mechanical energy into an electrical energy, wherein said mechanical energy is work of a force exerted upon said seat, said autonomously powered transmitter device being configured for transmitting a data signal containing said out-put signal, wherein said control unit comprises a receiver module for receiving said data signal from said autonomously powered transmitter device.

2. Seat sensor system according to claim 1, comprising a plurality of seat sensors to be associated with different seats of a vehicle, wherein said control unit is configured for communication with each of said plurality of seat sensors.

3. Seat sensor system according to claim 1, wherein said autonomously powered transmitter device comprises a transmitter module, a piezo generator for converting a mechanical energy into electrical energy and an electronic converter unit for generating a transmitter module power supply from said electrical energy.

4. Seat sensor system according to claim 1, wherein said autonomously powered transmitter device further comprises processing means for encoding said output signal with a digital ID of said seat sensor into said data signal.

5. Seat sensor system according to claim 3, wherein said piezo generator comprises a piezofilm associated to a seating surface of said seat.

6. Seat sensor system according to claim 1, wherein said seat sensor further comprises a seat occupancy detector for sensing an occupancy of said seat, said occupancy detector being connected to said autonomously powered transmitter device.

7. Seat sensor system according to claim 6, wherein said seat occupancy detector comprises a pressure sensitive switching device comprising a plurality of individual pressure sensors or switches to be arranged at different locations with respect to a seat surface.

8. Seat sensor system according to claim 1, wherein said seat sensor further comprises a seat belt fastening detector for determining a seat belt usage condition related to said seat, said seat belt fastening detector being connected to said autonomously powered transmitter device.

9. Seat sensor system comprising
   at least one seat sensor for sensing a status related to a seat occupancy and for generating an output signal indicative of said status, and
   a control unit for communicating with said at least one seat sensor,
   wherein said at least one seat sensor comprises an autonomously powered transmitter device associated with a seat, said autonomously powered transmitter device including a device configured to power the autonomously powered transmitter through a conversion of a mechanical energy into an electrical energy, said autonomously powered transmitter device being configured for transmitting a data said out-put signal, wherein said control unit comprises a receiver module for receiving said data signal from said autonomously powered transmitter device,
   wherein said seat sensor further comprises a seat belt fastening detector for determining a seat belt usage condition related to said seat, said seat belt fastening detector being connected to said autonomously powered transmitter device, wherein said seat belt fastening detector comprises a seat belt buckle switch sensor.

10. Seat sensor system comprising
    a plurality of seat sensors to be associated with different seats of a vehicle, said seat sensors for sensing a status related to a seat occupancy of a respective seat and for generating an output signal indicative of said status, wherein each of said seat sensors comprises an autonomously powered transmitter device associated with a seat, said autonomously powered transmitter device including a device configured to power the autonomously powered transmitter through a conversion of a mechanical energy into an electrical energy, wherein said mechanical energy is work of a force exerted upon said seat, said autonomously powered transmitter device being configured for transmitting a data signal containing said output signal; and
    a control unit for communicating with said plurality of seat sensors, wherein said control unit comprises an receiver module for receiving said data signals from said autonomously powered transmitter devices, said control unit being configured for communication with each of said plurality of seat sensors.

11. Seat sensor system according to claim 10, wherein said autonomously powered transmitter device comprises a transmitter module, a piezo generator for converting a mechanical energy into electrical energy and an electronic converter unit for generating a transmitter module power supply from said electrical energy.

12. Seat sensor system according to claim 10, wherein said autonomously powered transmitter device further comprises processing means for encoding said output signal with a digital ID of said seat sensor into said data signal.

13. Seat sensor system according to claim 11, wherein said piezo generator comprises a piezofilm associated to a seating surface of said seat.

14. Seat sensor system according to claim 10, wherein said seat sensor further comprises a seat occupancy detector for sensing an occupancy of said seat, said seat occupancy detector being connected to said autonomously powered transmitter device.

15. Seat sensor system according to claim 14, wherein said seat occupancy sensor comprises a pressure sensitive switching device comprising a plurality of individual pressure sensors or switches to be arranged at different locations with respect to a seat surface.

16. Seat sensor system according to claim 10, wherein said seat sensor further comprises a seat belt fastening detector for determining a seat belt usage condition related to said seat, said seat belt fastening detector being connected to said autonomously powered transmitter device.

17. Seat sensor system comprising
a plurality of seat sensors to be associated with different seats of a vehicle, said seat sensors for sensing a status related to a seat occupancy of a respective seat and for generating an output signal indicative of said status, wherein each of said seat sensors comprises an autonomously powered transmitter device associated with a seat, said autonomously powered transmitter device including a device configured to power the autonomously powered transmitter through a conversion of a mechanical energy into an electrical energy, said autonomously powered transmitter device being configured for transmitting a data signal containing said output signal; and
a control unit for communicating with said plurality of seat sensors, wherein said control unit comprises an receiver module for receiving said data signals from said autonomously powered transmitter devices, said control unit being configured for communication with each of said plurality of seat sensors,
wherein said seat sensor further comprises a seat belt fastening detector for determining a seat belt usage condition related to said seat, said seat belt fastening detector being connected to said autonomously powered transmitter device, wherein said seat belt fastening detector comprises a seat belt buckle switch sensor.

18. Seat sensor system according to claim 9, wherein said mechanical energy is work of a force exerted upon said seat.

19. Seat sensor system according to claim 17, wherein said mechanical energy is work of a force exerted upon said seat.

20. Seat sensor system according to claim 9, wherein said autonomously powered transmitter device comprises a transmitter module, a piezo generator for converting a mechanical energy into electrical energy and an electronic converter unit for generating a transmitter module power supply from said electrical energy.

21. Seat sensor system according to claim 9, wherein said autonomously powered transmitter device further comprises processing means for encoding said output signal with a digital ID of said seat sensor into said data signal.

22. Seat sensor system according to claim 20, wherein said piezo generator comprises a piezofilm associated to a seating surface of said seat.

23. Seat sensor system according to claim 9, wherein said seat sensor further comprises a seat occupancy detector for sensing an occupancy of said seat, said occupancy detector being connected to said autonomously powered transmitter device.

24. Seat sensor system according to claim 23, wherein said seat occupancy detector comprises a pressure sensitive switching device comprising a plurality of individual pressure sensors or switches to be arranged at different locations with respect to a seat surface.

25. Seat sensor system according to claim 17, wherein said autonomously powered transmitter device comprises a transmitter module, a piezo generator for converting a mechanical energy into electrical energy and an electronic converter unit for generating a transmitter module power supply from said electrical energy.

26. Seat sensor system according to claim 17, wherein said autonomously powered transmitter device further comprises processing means for encoding said output signal with a digital ID of said seat sensor into said data signal.

27. Seat sensor system according to claim 25, wherein said piezo generator comprises a piezofilm associated to a seating surface of said seat.

28. Seat sensor system according to claim 17, wherein said seat sensor further comprises a seat occupancy detector for sensing an occupancy of said seat, said seat occupancy detector being connected to said autonomously powered transmitter device.

29. Seat sensor system according to claim 28, wherein said seat occupancy sensor comprises a pressure sensitive switching device comprising a plurality of individual pressure sensors or switches to be arranged at different locations with respect to a seat surface.

* * * * *